United States Patent [19]
Greyson et al.

[11] Patent Number: 5,442,742
[45] Date of Patent: Aug. 15, 1995

[54] METHOD AND APPARATUS FOR THE MANIPULATION OF TEXT ON A COMPUTER DISPLAY SCREEN

[75] Inventors: Ann M. Greyson, Sunnyvale; Jeffrey D. Hokit, Mountain View; Marjory Kaptanoglu, San Carlos; Annette M. Wagner, La Honda; Stephen P. Capps, Redwood City, all of Calif.

[73] Assignee: Apple Computer, Inc., Cupertino, Calif.

[21] Appl. No.: 137,375

[22] Filed: Oct. 14, 1993

Related U.S. Application Data

[63] Continuation of Ser. No. 632,318, Dec. 21, 1990, abandoned.

[51] Int. Cl.⁶ ............................................. G06F 17/24
[52] U.S. Cl. .................... 395/146; 395/155; 364/419.1; 345/157
[58] Field of Search ............... 395/146, 148, 155, 157; 364/419.1, 419.14, 943, 943.1, 943.43, 943.44, 943.5; 345/156, 157

[56] References Cited

U.S. PATENT DOCUMENTS 4,095,185  2/1990  Sakai ................................. 364/900

OTHER PUBLICATIONS

Microsoft Corporation, *Microsoft Windows Paint User's Guide* Version 2.0, 1987, pp. 8–10, 44–45.
Microsoft Corporation, *Microsoft Windows Write User's Guide*, Version 2.0, 1987, pp. 60–65.
Microsoft Corporation, *Microsoft Word: Using Microsoft Word*, Version 5.0, 1989, pp. 69, 88–93.
*Microsoft Windows User's Guide;* Version 3.0; 1990; pp. 273–279, 296–301.

*Primary Examiner*—Mark K. Zimmerman
*Assistant Examiner*—Joseph Feild
*Attorney, Agent, or Firm*—Blakely, Sokoloff, Taylor & Zafman

[57] ABSTRACT

A means and method for directly manipulating text on a computer display screen. A selected block of text is first identified for manipulation. After being identified, the selected block of text is highlighted on the display screen using contrasting colors or a reverse video. A text manipulation handle associated with the selected text block is displayed. The user may then directly manipulate the selected text block by positioning a cursor within the text manipulation handle and activating a signal generation device. When this occurs, the selected text block may be moved around the display screen while remaining visible using the cursor control device as long as the signal generation device remains active. A shadow image and insertion marker associated with the selected text block is displayed while the selected text block is moveable. A cutting or copying operation may be selected when the signal generation device is activated. The cutting operation removes the selected text block from the available text leaving a blank area at its original position. The copying operation retains the original selected text block in its previous position in the available text. When the signal generation device is deactivated, the selected text block is inserted or pasted into the available text at the position indicated by the insertion marker. The available text is then reformatted to achieve continuity in the lines of available text.

14 Claims, 6 Drawing Sheets

┌─210
│
it's not a question of where he grips it,
it's a simple matter of weight-ratios ...
a five-ounce bird could not hold a
one-pound coconut. Look! To maintain a

Figure 2b

┌─210  ┌─212 ┌─211
│
it's not a question of where he grips it,
it's a simple ▎matter▎ of weight-ratios ...
a five-ounce bird could not hold a
one-pound coconut. Look! To maintain a
    214                    213

Figure 2c

┌─210           ┌─215
│
it's not a question of where he grips it,
it's a simple          of weight-ratios ...
a five-ounce bird could not hold a
one-pound coconut. Look! To maintain a
                                         211
        214        ▎matter▎
                                  213
                 212

Figure 2d

┌─210
│
it's not a question of where he grips it,
it's a simple of weight-ratios ... a five-ounce
bird could not hold a one-pound coconut.
Look!▎matter▎To maintain a
    212           211

METHOD AND APPARATUS FOR THE MANIPULATION OF TEXT ON A COMPUTER DISPLAY SCREEN

This is a continuation of application Ser. No. 07/632,318, filed Dec. 21, 1990, now abandoned.

BACKGROUND OF THE INVENTION

1. Field of the Invention

The present invention relates to user interfaces for computer display systems. Specifically, the present invention relates to the direct manipulation of text on a computer display screen.

2. Prior Art

Modern interactive computer systems have become very popular for use in word processing. With the development of more powerful and faster computer hardware, these state-of-the-art computers are capable of processing greater amounts of data in a shorter amount of time. Similarly, ever more sophisticated and powerful software systems are being developed to run on these high powered computers. Specifically, word processing software has become a common component in most any computer system. A goal in the design and development of these word processing software applications has been to design the most powerful system possible while maintaining an understandable and easy-to-use user interface.

Word processing software user interfaces employing a "what you see is what you get" (i.e. WYSIWYG) philosophy have gained a great deal of popularity among computer users. One reason for this popularity is that users prefer to see a visual result of the functions and operations they apply to a particular document or text region of the display screen. This visual reinforcement is an important aspect of any software package assisting a user in generating or manipulating text. Often, a user is not sure exactly what result to expect from the application of a particular command or operation; yet knowing the exact form of the results is important in determining whether or not the operation should be performed at all.

Prior art computer systems employ various methods for implementing user interfaces with a WYSIWYG philosophy. Specifically, several systems provide commands for cutting (i.e. removing), copying, and pasting (i.e. inserting) blocks of text in a computer system environment or a particular document using a highly visual and manipulable user interface methodology. Two examples of such prior art systems are the Finder TM interface of the Apple Macintosh TM computer, developed by Apple Computer, Inc. of Cupertino, Calif. and Microsoft Word TM, developed by Microsoft., Inc. of Redmond, Wash. Both these and other computer-based systems employ a text manipulation technique whereby a block of text is first identified for manipulation using a series of keyboard keystrokes or using a cursor control device for positioning a cursor (i.e. pointer) symbol on the display screen. A computer mouse or trackball device may be used as a cursor control device. The identified (i.e. selected) block of text is typically indicated on the display screen in a contrasting color or reverse video.

Once selected, various operations may be applied to the selected block of text in these prior art systems. Two such operations most commonly used are: (1) the cut or remove operation and (2) the copy operation. When the cut operation is invoked, the selected block of text is typically deleted from the display screen and the remaining unselected portions of text from the text region or document are reformatted to fill the blank area left by the deleted block of text. In addition to being removed from the display screen, the deleted text is typically transferred to a memory buffer or temporary disk file neither of which is visible to the user on the display screen. In the Apple Macintosh TM computer, this temporary buffer is called a clipboard or clipboard file. Other systems may use a different terminology; but, a temporary storage buffer not visible to the user typically exists in these systems.

When the copy operation is invoked for a selected block of text, the selected block of text is copied to the clipboard, but remains in position within the document. Thus, an invisible copy of the selected text is maintained within the clipboard or temporary holding buffer in a manner similar to the cut operation.

Other derivative forms of the cut and copy operations may exist in the prior art, but the steps described above generally apply to the prior art systems. For example, a block of text may first be selected. The user may then choose to insert new text into the position occupied by the selected text. If the user begins to insert new text by typing characters on a keyboard coupled to the computer system, prior art systems typically perform an implied cut or remove text operation on the selected text prior to insertion of the new text. This implied cut operates in the same manner as the cut operation described above. That is, the selected block of text is removed from the display screen and transferred to the invisible clipboard.

In addition to cut and copy operations, prior art systems typically provide a means for pasting (i.e. inserting) previously cut or copied text into a new position within a document or a text region on the display screen. The typical prior art pasting operation is performed by first identifying an insertion position within a document or text region where the insertion will be applied. This insertion position identification may be performed using keyboard key strokes or the cursor control device (i.e. mouse). Prior art systems typically indicate the identified insertion position by means of a small visual symbol displayed on the display screen at the paste position. Once this position is identified, the user then invokes a paste or insert command. On invocation of the paste command, the current contents of the clipboard or temporary holding buffer are transferred to the document or text region starting at the insertion position. The other unselected portions of text are reformatted to make room for the newly pasted block of text. The pasted block of text is thus transferred from the invisible clipboard or temporary holding buffer to the indicated insertion position. Once the paste operation is complete, the user is able to view the result of the operation on the display screen. Unfortunately, the user is not given the opportunity to view the block of text in the clipboard prior to the completion of the paste operation. While some prior art systems provide a means for viewing the clipboard or holding buffer, this viewing involves activating a separate set of controls and often may obscure a portion of the display screen while the clipboard is being viewed. In addition, full text formatting of the block of text in the clipboard is lost while viewing the clipboard.

Other prior art systems outside of the computer-based word processing environment are designed for drawing graphics images and text on a computer display screen. One such prior art system is MacDraw ™ developed by Apple Computer, Inc., Cupertino, Calif. These prior art drawing systems provide a means for inserting and manipulating blocks of text; however, these systems typically treat each block of text as a separate entity or object. Since each text object is separate, the capability to reformat an entire document is lost. For example, one block of text cannot be conveniently merged into another block with the corresponding line justification and word wrap operations being performed as in a word processing environment. In addition, drawing systems often impose size restrictions on the number of characters inserted into a particular text object.

Thus, a means for the direct manipulation of text is needed. It is, therefore, an object of the present invention to provide a means for directly manipulating text in a way that provides effective visual feedback for the user. It is a further object of the present invention to provide a direct text manipulation method requiring fewer user control activations thereby simplifying the user interface. These and other objectives and features of the present invention will be discussed in more detail in the sections that follow.

SUMMARY OF THE INVENTION

The present invention provides a means and method for directly manipulating text on a computer display screen. The text manipulated using the present invention includes alphanumeric characters, purely numeric characters, special symbols or other images displayable on a computer controlled display screen. The present invention comprises an interactive computer display system including a bus for interconnecting systems components, a processor, processing logic, a random access memory, a display device including a display screen, a cursor control device for interactively positioning a cursor (i.e. pointer) on a display screen, a signal generation device for signalling command selections and, optionally, a read only memory, a data storage means for storing data and an alphanumeric input device. The present invention provides a means and a method for identifying a block of text that is visible anywhere on a display screen and subsequently manipulating the selected text. The manipulation of the selected block of text is carried out while the selected block of text is visible to the user. In addition, fewer control activations are required to directly manipulate text in the manner described. Several operations may be performed on text using the techniques of the present invention including cutting (i.e. removing) text, copying text, or pasting (i.e. inserting) text.

When a block of text is selected, a small visual text manipulation handle symbol appears on one edge of the selected block of text. The user can then position a cursor control device or mouse within the handle and subsequently activate a signal generation device or mouse button. The combination of these operations allows the user to logically pick up and visually move the selected block of text anywhere around the display screen, while the unselected portion of text remains stationary. A visual representation of this moving block of text is presented to the user. If the selected block is too large to be conveniently moved and displayed in its entirety, only a portion is visually displayed. A shadow image is displayed under the selected block of text to aid the illusion that the selected block is being picked up.

On picking up the selected block of text, a copy operation may be invoked by activating a key on the keyboard. When the copy operation is invoked, a copy of the selected block of text is retained in its initial position before it is moved. If the copy operation is not invoked, the cutting operation is assumed. The cutting operation removes the selected block of text from its initial position on the display screen leaving a blank area in the document or text region where the selected text was originally located. When the selected block of text is logically picked up, another visual symbol (insertion or caret symbol) appears in the unselected text indicating the location at which the selected block of text will be inserted or pasted when the user initiates the pasting operation. Using the insertion marker, the user can identify a position within the document or text region where the selected block of text is to be pasted. Once the desired insertion position is identified, the user simply releases the signal generation device or reactivates it thereby causing the selected block of text to be pasted into the identified insertion position. The remaining unselected portions of text in the document or text region are reformatted to make room for the inserted block of text thus maintaining continuity of the lines of text within the document. The blank area from which the selected block of text was removed is filled in as the surrounding text is reformatted.

Thus, the present invention provides a means for directly and visually cutting, copying, and pasting a block of text. This invention provides a method and a means for overcoming the failure of prior text manipulation systems of being able to directly and visually manipulate text on a computer display screen.

DETAILED DESCRIPTION OF THE PREFERRED EMBODIMENT

The present invention provides a means and a method for directly manipulating text on a computer display screen. The text directly manipulated using the present invention includes alphanumeric characters, purely numeric characters, special symbols or other images displayable on a computer controlled display screen. The following detailed description describes a preferred embodiment of the direct text manipulation device and technique of the present invention. In the following description, numerous specific details are set forth in order to provide a thorough understanding of the present invention. In other instances, well known techniques and structures have not been shown in detail in order to not unnecessarily obscure the present invention.

Figure 1:
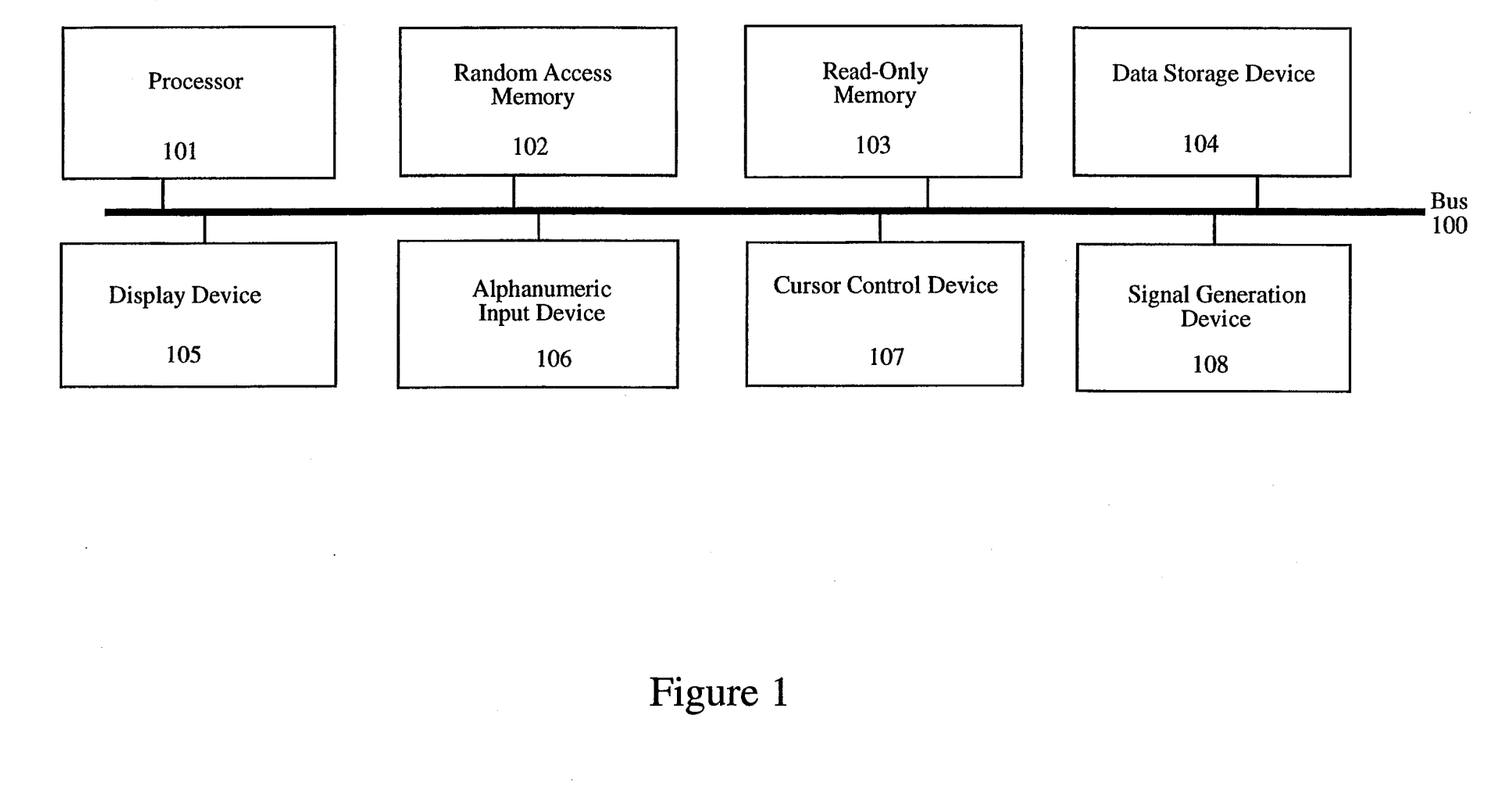
FIG. 1 is an illustration of the computer system architecture.

The preferred embodiment of the present invention is implemented on an Apple Macintosh ™ computer system. It will be apparent to those with ordinary skill in the art, however, that alterative computer systems may be employed. In general, such computer systems, as illustrated by FIG. 1, comprises a bus 100 for communicating information, a processor 101 coupled with said bus for processing information, a random access memory 102 coupled with said bus 100 for storing information and instructions for said processor 101, a display device 105 coupled to said bus 100 for displaying information to a computer user, a cursor control device 107 coupled to said bus for communicating information and command selections to said processor 101, and a signal generation device 108 coupled to said bus 100 for communicating command selections to said processor 101. Optionally, said computer systems may include a read only memory 103 coupled with said bus 100 for storing static information and instructions for said processor 101, a data storage device 104 such as a magnetic disk and disk drive coupled with said bus 100 for storing information and instructions, and an alphanumeric input device 106 including alphanumeric and function keys coupled to said bus 100 for communicating information and command selections to said processor 101.

The display device 105 may be a liquid crystal device, cathode ray tube, or other suitable display device. Color or gray scale display systems provide a better representation of the layering and shadowing effects of the present invention. The cursor control device 107 is a pointing device allowing the computer user to dynamically signal the two or three dimensional movement of a visible symbol (i.e. cursor) on the display screen of said display device 105. Many implementations of the cursor control device are well known in the art including trackball, mouse, joy stick, or special keys on the alphanumeric input device 106 capable of signalling movement in a given direction.

Similarly, signal generation device 108 may be implemented as a button or switch located on or near the cursor control device 107. The physical proximity of cursor control device 107 and signal generation device 108 allows a user to manipulate both devices simultaneously with one hand. The signal generation device may be operated between two control states: an active control state and an inactive control state. The signal generation device is active when in the active control state and deactivated when manipulated to the inactive control state.

OPERATION OF THE PREFERRED EMBODIMENT

The processing logic of the preferred embodiment is operably disposed within random access memory 102 and, executed by processor 101 of the computer system described above. The processing logic of the present invention may equivalently be disposed in read-only memory 103 or other memory means accessible to processor 101 for execution. This processing logic can be a separately compiled or loaded entity or incorporated as a part of a larger word processing system. In either case, a means for activating the processing logic of the present invention may be performed using techniques well known to those of ordinary skill in the art. Once activated, the processing logic of the present invention operates in the manner described below.

Figure 2A:
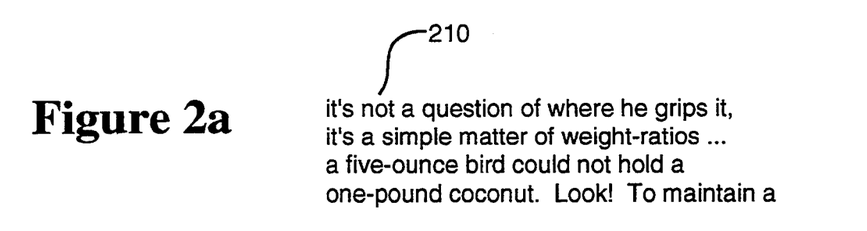
FIGS. 2a–2i illustrate the operation of the preferred embodiment on an arbitrary set of text displayable on a display device.

In a word processing environment, the user of a computer system is involved with the insertion, editing, and manipulation of text. This text manipulation may be in the context of a document that is being edited or a region of text on the display screen that is being manipulated. In either case, a user of the present invention will encounter a set of available or manipulable text that is displayed or displayable on the display screen. An example of such a display of text is illustrated in FIG. 2a. As shown in FIG. 2a, an arbitrary set of available text 210 comprising multiple lines of alphanumeric characters provides a word processing environment most illustrative for describing the operation of the present invention. It will be apparent to those skilled in the art that the methods of the present invention may be used in other computing environments. For example, a set of available text may equivalently comprise a single line of text, a set of purely numeric characters, a set of special characters or other displayable symbols. In addition, character formats for non-English languages may also be configured with the present invention. As described below, the present invention provides means for {) cutting, copying, and pasting selected portions of text of the set of available text 210.

Initially, the user will be able to position a cursor symbol anywhere within available text 210. Once the user has positioned the cursor at the desired position, the signal generation device may be activated. The initial activation of the signal generation device defines an initial selection point within the available text 210. Subsequent movement of the cursor control device while the signal generation device is active will cause a selection region to be defined between the initial selection point and the current position of the cursor. If the available text is English, Roman-based text, or another row-oriented text format, this selection region identifies a block of text typically defined in terms of character positions extending from the initial selection point to the end of the current line then to the left-most character of the next line and on down the page from left to right until reaching the current cursor position. For non-English text, a column-oriented text format, or other text format, the selection region may be defined in a different manner. The initial selection point and the current position of the cursor will be sufficient to define the bounds of the selection region using most any text format. When the signal generation device is deactivated, the cursor position where the deactivation occurred becomes the final selection position. The region defined between the initial selection point and the final selection point becomes the text region denoting the selected text block. The presence and location of the selected text block may be visually indicated by highlighting the selected text block region either in a contrasting color or in a reverse video image. Techniques for selecting and displaying a selected block of text in this manner are well known to those of ordinary skill in the art.

Figure 2B:
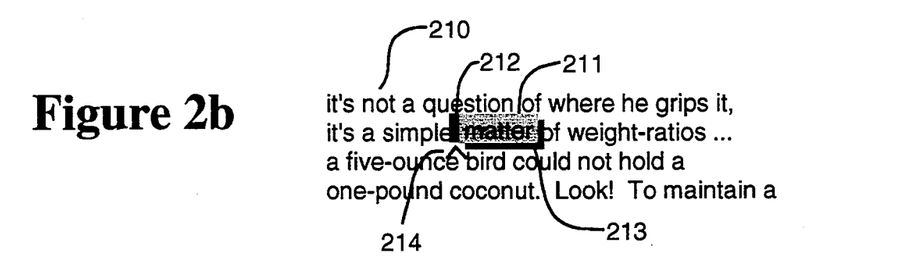

Once a text block is selected, the operation of the present invention comes into play. Referring to FIG. 2b, an arbitrary set of available text 210 is again shown. A selected block of text 211 selected and highlighted in the manner described above is also shown. The additional components provided by the operation of the present invention include: text manipulation handle 212, selected block shadow 213, and insertion marker 214. The operational characteristics of these components of the preferred embodiment of the present invention are described in the following sections.

When a block of text is selected by a user, the processing logic of the present invention highlights the selected text block and displays a text manipulation handle 212. Text manipulation handle 212 is a region on the display screen associated with the selected text block 211 and used to directly manipulate the selected text block 211. In the preferred embodiment, text manipulation handle 212 is displayed on the display screen by the processing logic of the present invention as a small translucent rectangular shaded region adjacent to selected text block 211 as shown in FIGS. 2b through 2i. It will be apparent to those skilled in the art that text manipulation handle 212 may be displayed in alternative and equivalent ways.

Once a block of text is selected and text manipulation handle 212 is displayed on the display screen, the user is free to move the cursor anywhere on the display screen. When the user moves the cursor symbol within the region defined by text manipulation handle 212, the processing logic of the present invention causes the displayed cursor symbol to be changed to a symbol specifically associated with the direct manipulation of text. This direct text manipulation cursor symbol provides the user with a visual indication that the selected text block 211 associated with text manipulation handle 212 is available for manipulation. As long as the user keeps the cursor located within text manipulation handle 212 by manipulation of cursor control device, the direct text manipulation cursor symbol will be displayed.

While the cursor is positioned within text manipulation handle 212, the user may activate the signal generation device (i.e. mouse button or other equivalent signal generation means). The combination of positioning the cursor within text manipulation handle 212 and activation of the signal generation device, indicates to the processing logic of the present invention that the user wishes to logically pick up and move the selected text block 211. Thus, on activation of the signal generation device, the processing logic of the present invention displays a shadow image 213 in proximity to selected text block 211 thereby giving the user the impression that the selected text block 211 has been lifted off of the page of text. In addition, a small insertion marker 214 is displayed in the unselected text to indicate a point where the selected text would be inserted on deactivation of the signal generation device. In the preferred embodiment, the insertion marker 214 is indicated by a small caret () symbol displayed at an insertion position in the unselected text and associated with the current position of the selected text block 211. The insertion marker 214 moves in corresponding fashion with the movement of the selected text block 211. The insertion marker 214 is displayed at an insertion position in the unselected text that is closest to the position of the selected text block 211. The display presentation of the selected text block shadow 213 and insertion marker 214 is displayed in FIGS. 2b, 2c, 2e and 2g through 2h.

Figure 2C:
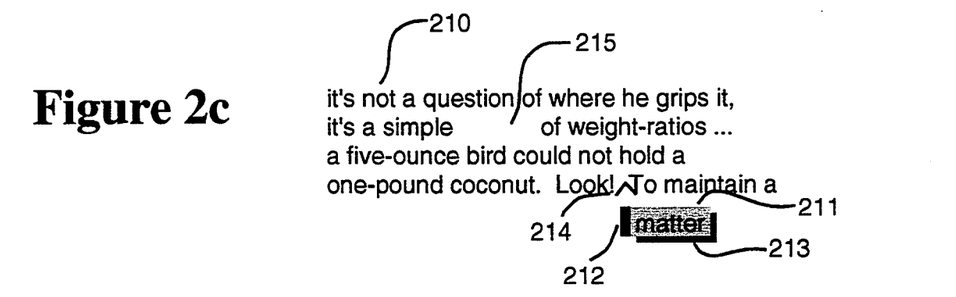

The entire selected text block 211 and associated text manipulation handle 212 can be moved around the display screen in two dimensions using the cursor control device as long as the signal generation device remains active. If the cursor control device is a three dimensional device, the entire selected text block 211 and associated text manipulation handle 212 can be moved around the display screen in three dimensions. The two-dimensional movement of selected text block 211 is depicted in FIG. 2c. As shown in FIG. 2c, the selected text associated with selected text block 211 is moved out of the document or text region (i.e. available text) where it originally resided. A blank area 215 remains where the selected text was removed. This action of picking up and moving a selected text block improves the prior art method of cutting a block of text to an invisible clipboard or temporary holding buffer. In the present invention, the selected text cut from the available text remains visible on the display screen. If the selected text block 211 is too large to be fully displayed and conveniently moved with the cursor control device, only a representative portion (i.e. the first two lines of the selected text block) is actually displayed. An ellipsis placed at the end of the visible portion of text indicates to the user that the displayed portion of text is only a representative sample.

Figure 2D:
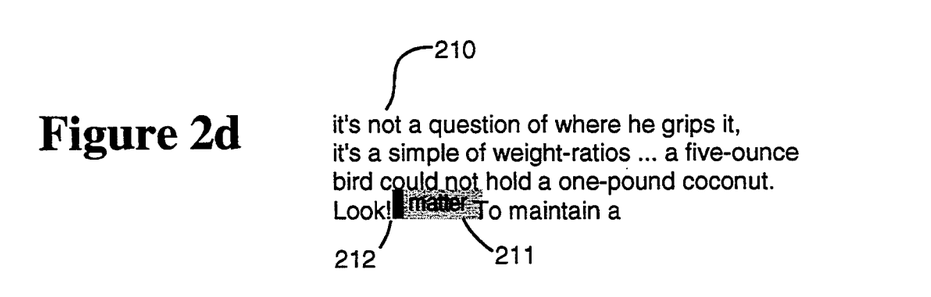

As long as the signal generation device remains active (i.e. by keeping the mouse button depressed), the selected text block 211 may be moved around the display screen in the manner described above and illustrated in FIG. 2c. As shown, the insertion marker 214 is displayed in the unselected text at an insertion point closest to the position of the selected text block 211. Once the signal generation device is deactivated (i.e. by releasing the mouse button), the selected text block 211 is inserted into the available text at the insertion point indicated by the insertion marker 214. In addition, the available text is reformatted as shown in FIG. 2d. Note that blank area 215 has been removed, and the lines of text in the available text have been reformatted to re-establish continuity between the text words on each side of the former blank area 215. Methods for reformatting text in this manner are techniques well known in the art. Note also in FIG. 2d that the shadow 213 and insertion marker 214 have been removed after signal generation device deactivation, since the selected text block 211 is no longer associated with the movement of the cursor control device. Thus, a means for visibly cutting and moving a selected block of text on the display screen using the techniques of the present invention is described.

Figure 2E:
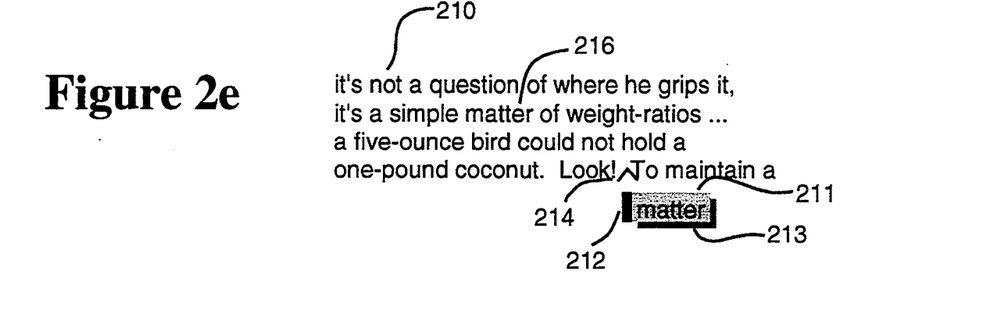
Figure 2F:
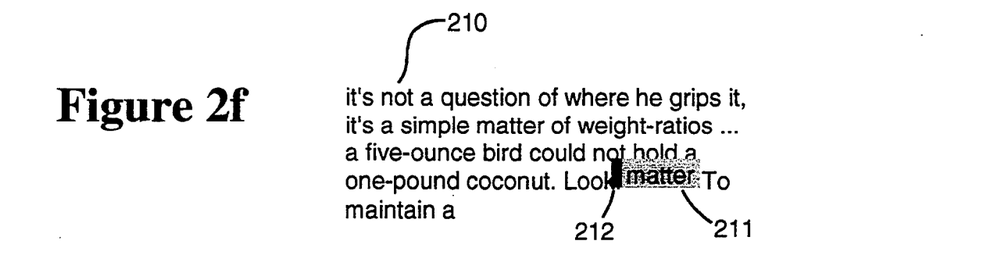

An improved copy operation is also provided by the present invention using a technique similar to that described above for the cutting operation. The difference between the cutting and copying operations occurs at the time the signal generation device is activated while the cursor is located within text manipulation handle 212. In the preferred embodiment, activation of the signal generation device alone initiates the cutting operation as described above. In the alternative, activating the signal generation device concurrently with the activation of an option key on the keyboard initiates the copying operation. Both operations provide a means for moving a selected block of text with the movement of the cursor control device in the manner described above. With the copying operation, however, a copy of the selected text moves with the selected text block while the original selected text remains fixed in its initial position within the available text. The copying operation is depicted in FIGS. 2e and 2f. Note that the blank area 215 present in FIG. 2c associated with the cutting operation is not present in the copying operation depicted in FIG. 2e. This is because the selected text 216 still occupies the original location of the selected text block; thus, no blank area 215 appears during the copying operation. In similar fashion to the paste operation shown in FIG. 2d after the cut operation, the paste operation after the copy operation is shown in FIG. 2f. As illustrated in FIG. 2f, the selected text block 211 is inserted into the available text at the insertion point indicated by the insertion marker 214 after the signal generation device is deactivated (i.e. by releasing the mouse button). In addition, the available text is reformatted as shown in FIG. 2f.

Figure 2G:
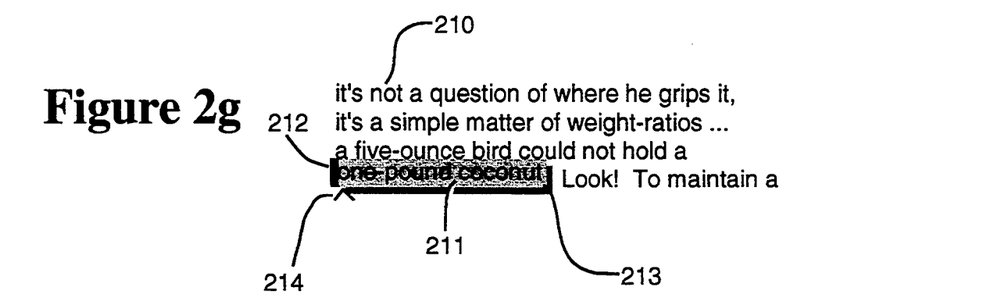
Figure 2H:
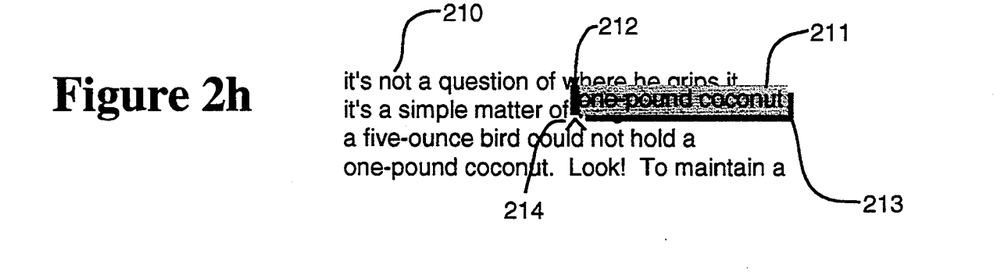
Figure 2I:
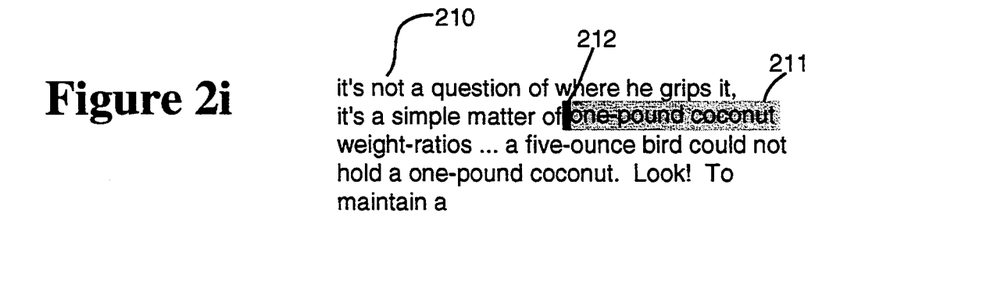

Referring now to FIG. 2g, the operation of the paste or insert feature of the present invention is more fully illustrated. Using either the cutting or copying operations as described above, a selected text block with its associated insertion marker can be moved in two or three dimensions around the display screen using the cursor control device. This movement can occur as long as the user continues activation of the signal generation device. Using the visual insertion marker, the user can selectively determine the position in a document or set of available text where the selected text block will be inserted. Using the cursor control device, the user positions the insertion marker 214 near the character position at which insertion should occur. This action is depicted in FIG. 2h. Once the user has positioned insertion marker 214 as desired, the signal generation device is deactivated. The result of deactivating the signal generation device is illustrated in FIG. 2i. When the signal generation device is deactivated, the processing logic of the present invention causes the text line to be split at the point indicated by the insertion marker 214. The selected text block is then inserted into the split text line at the insertion marker character position. The selected text block and the remainder of the available text is then reformatted to produce the proper margins, line justification, and word wrap as previously configured for the document or text region. Techniques for reformatting a text area to produce proper margins, line justification, and word wrap are well known to those skilled in the art. Once the insertion of the selected text block into the available text has occurred, the selected text block is no longer associated with the movement of the cursor control device. The selected text block thus remains stationary at the inserted position. Since movement of the selected text block is no longer available, the selected text block shadow 213 and insertion marker 214 are removed from the display screen. The text manipulation handle 212, however remains displayed. Similarly, the selected text block remains highlighted as this text block is still selected for manipulation. As described earlier, the user is now free to move the cursor control device thereby causing the cursor symbol to move out of text manipulation handle 212. If the signal generation device is activated while the cursor is positioned outside of the text manipulation handle but still within the same document or text region, the selected block of text is deselected and the text manipulation handle 212 is removed from the display screen. While the selected block of text is still selected, however the process of direct text manipulation may be repeated by again positioning the cursor within text manipulation handle 212 and activating the signal generation device as described above.

Thus, the operation of the direct text manipulation function of the present invention is described. In the preferred embodiment, these direct text manipulation functions have been shown to include the cutting operation, the copying operation, and the insert or paste operation. It will be apparent to those skilled in the art that other derivative forms of these basic functions may be implemented using the techniques described above.

PROCESSING LOGIC OF THE PREFERRED EMBODIMENT

The present invention includes computer program logic for the operation of the direct text manipulation function. This program logic is described in the following section and illustrated in FIGS. 3 through 5. In addition to the computer resources described earlier, the present invention relies upon the availability of an operating system and system functions capable of displaying text or alphanumeric characters, cursor symbols, and a means for displaying highlighted text regions or other means for highlighting text on the display device. System functions for communicating with the cursor control device and signal generation device (i.e. mouse and mouse button) are also required. These resources are standard processing components known in the computer art.

When the processor of the computer system of the present invention is first powered up, the operating system logic takes control and initializes systems components such as read/write memory, the display device, the cursor control device, the signal generation device, and the alphanumeric keyboard. At the end of its initialization cycle or in response to a user command, the operating system or other software may display a block of available text similar to the block of available text 210 shown in FIGS. 2a through 2i. The direct text manipulation program logic of the present invention receives control when a user of the computer system selects a block of text using techniques well known to those of ordinary skill in the art. It will be apparent to those of ordinary skill in the art that other means for initially activating the direct text manipulation function of the present invention are available.

Figure 3:
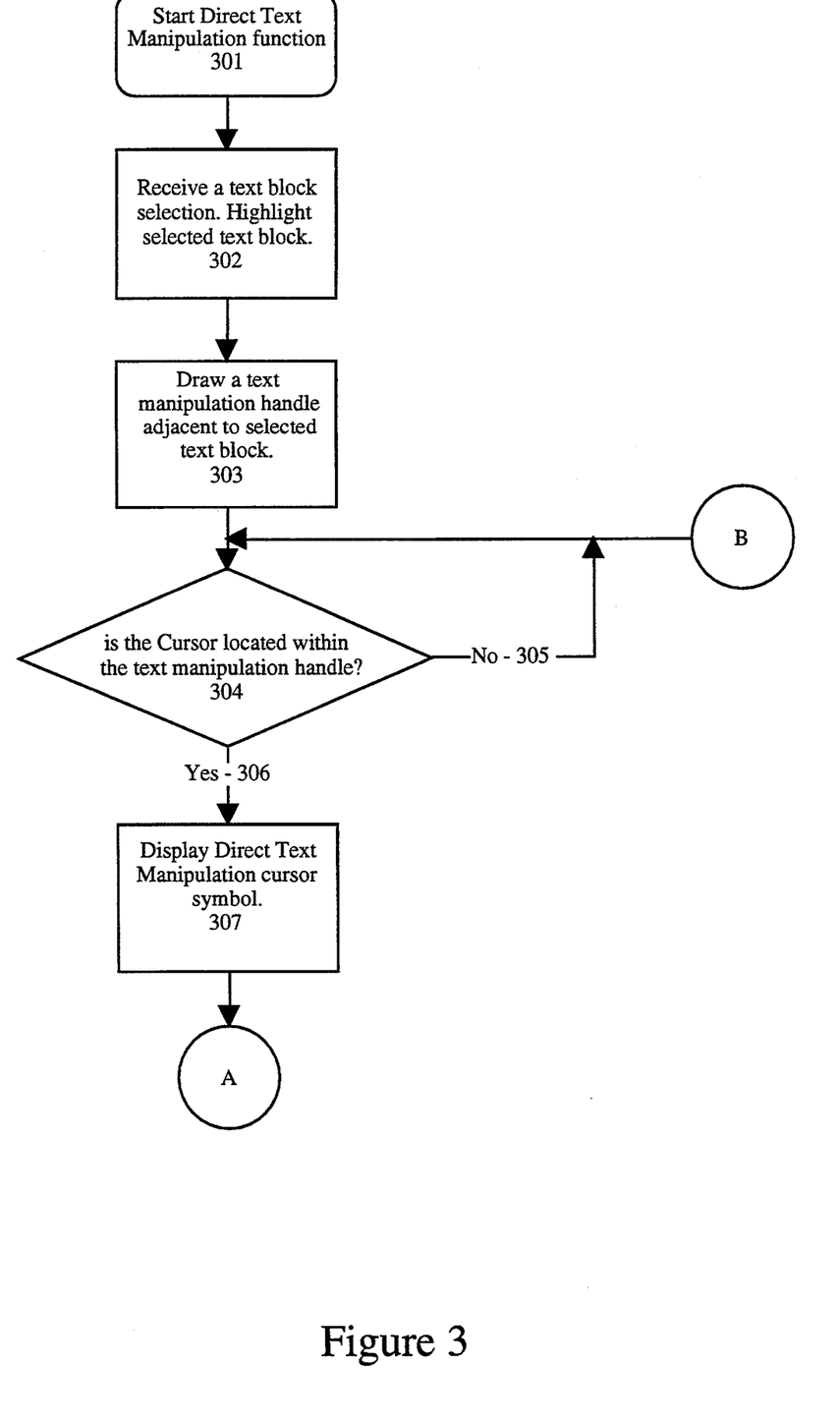
FIGS. 3–5 are processing flow diagrams of the processing logic of the present invention.

Once the user selects a block of text and the direct text manipulation program logic is activated, the processing flow begins as shown in FIG. 3 at the box labeled "Start Direct Text Manipulation function" 301. First, an identification of the selected block of text is received by the processing logic of the present invention. The selected block of text is highlighted by displaying the block in a reverse video or contrasting color (processing box 302). Next, the processing logic of the present invention draws a text manipulation handle adjacent to the selected text block on the display screen (processing box 303). Text manipulation handle 212 is illustrated in FIGS. 2b through 2h. The processing logic of the present invention then begins a loop beginning at decision box 304 as illustrated in FIG. 3. At decision box 304, the position of the cursor is determined. If the cursor is not located within the text manipulation handle region, processing flow loops back at decision path 305 to the top of decision box 304 where the cursor position is again queried. This loop will continue until the user has positioned the cursor within the text manipulation handle region using the cursor control device. It will be apparent to those skilled in the art that alternative methods exist for determining when the cursor is moved into the text manipulation handle region. For example, instead of the polling method illustrated in FIG. 3, the processing logic in an alternative embodiment may be notified or interrupted by the operating system when the cursor is moved within the text manipulation handle. Once the user has moved the cursor into the text manipulation handle, decision path 306 is taken as shown in FIG. 3. When this occurs, a special direct text manipulation cursor symbol is displayed on the display screen (processing box 307). Processing control then passes to the logic under the continuation symbol A starting in FIG. 4.

Figure 4:
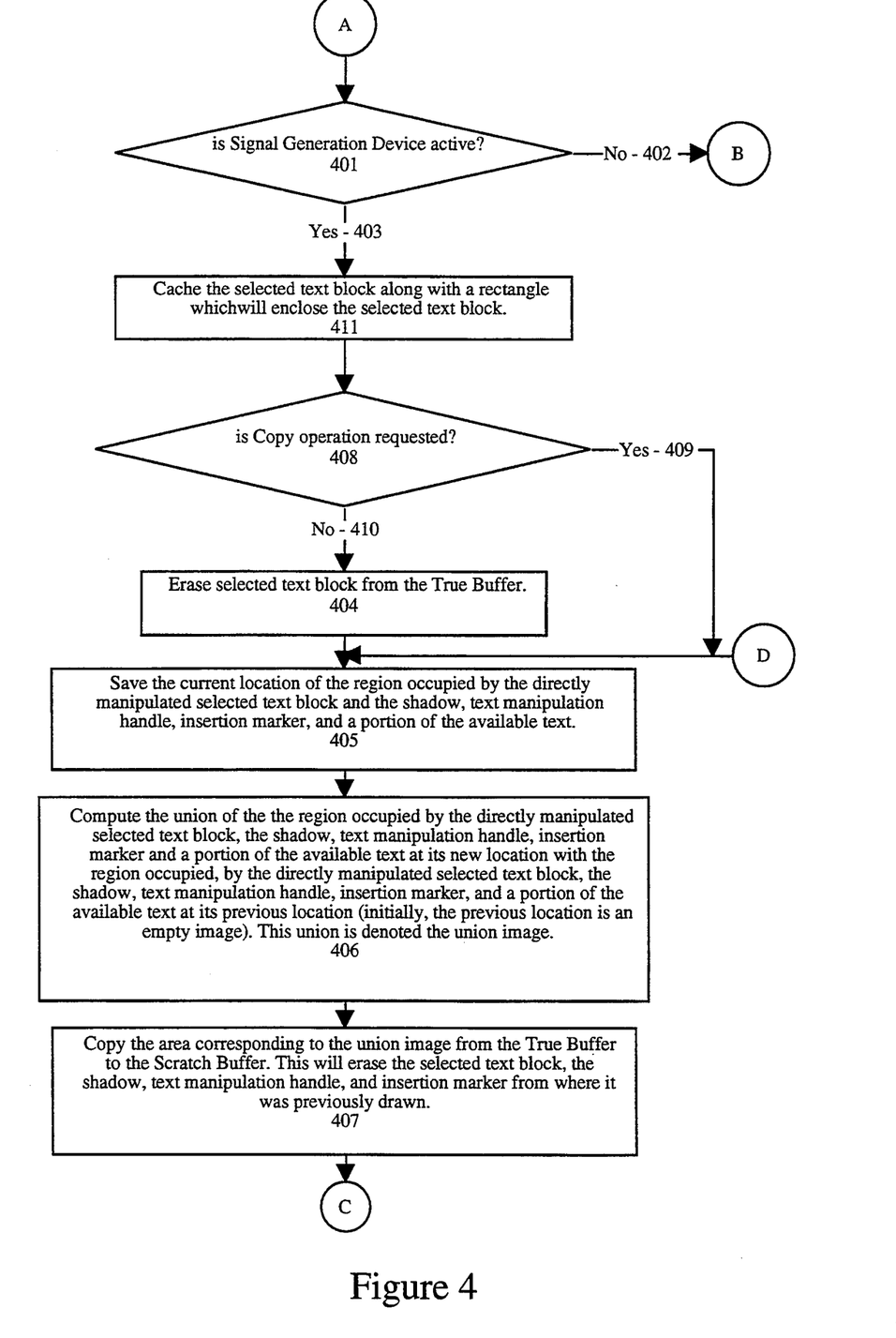

Referring now to FIG. 4, processing continues at continuation symbol A after the cursor has been positioned within the text manipulation handle and the cursor symbol has been changed to the direct text manipulation cursor symbol. Processing continues at decision box 401 where the signal generation device is queried. If the signal generation device (mouse button) is not active, processing continues at continuation symbol B in FIG. 3 (decision path 402). Again, it will be apparent to those skilled in the art that alternative methods for querying the signal generation device are available. For example, instead of the polling method illustrated in FIG. 4, the activation of the signal generation device may cause the processing logic of the present invention to be interrupted by the operating system. This alternative method would eliminate the need for the processing logic of the present invention to continually poll for the activation of this signal generation device. In one embodiment of the interrupt technique, an interrupt occurs when signal generation device activation is detected while the cursor is positioned within the available text region. When this occurs, a test is made to determine if the cursor is positioned within the text manipulation handle. If so, processing path 403 would be traversed in FIG. 4. In a second embodiment of the interrupt technique, an interrupt occurs when signal generation device activation is detected while the cursor is positioned within the text manipulation handle itself. Once the signal generation device is activated while the cursor is positioned within the text manipulation handle, processing path 403 is executed as shown in FIG. 4.

Having traversed processing path 403, processing box 411 is executed as shown if FIG. 4. Starting at processing box 411, the next sequence of processing steps are used to pick up and move the selected text block around the display screen in association with the movement of the cursor control device. Two internal graphics memory buffers are used for this purpose. Both of these buffers may be maintained in random access memory. The first internal graphics buffer is denoted herein as the True Buffer. The True Buffer contains an exact representation of one full page of the available text. The selected and unselected portions of available text displayed on the display screen are initially maintained in the True Buffer. The second internal graphics buffer is the Scratch Buffer. The Scratch Buffer is used to render or display the selected block of text as it is moved around the display screen. The sequence of processing steps for visually moving the selected block of text starts at processing box 411 where the character string of the selected block of text is cached along with a rectangle which will enclose the selected block of text as it is dragged around the screen. Next, decision box 408 is executed to determine if the cutting operation or the copy operation has been selected by the user. Either the cutting or copying operation may be selected on activation of the signal generation device. If a keyboard option key or other control means is used in combination with the activation of the signal generation device, the copy operation is selected. If this occurs, decision path 409 is taken in FIG. 4. If the signal generation device alone is activated, decision path 410 is executed. Following decision path 410, the selected text block is erased (i.e. cut) from the True buffer leaving a blank area (processing box 404). If decision path 409 is executed, the erasing step 404 is skipped thus leaving the original selected text block in the True buffer. The Scratch Buffer version of the selected text block serves as the directly manipulated text or moving selected text block which follows the movement of the cursor control device. Next, the current location of the directly manipulated or moving selected text block on the display screen is saved (processing box 405). Processing boxes 406 and 407 perform the operation of displaying the moving selected text block at a new location as the selected text block follows the movement of the cursor control device. This operation is performed by first computing the union of the moving selected text block region, including its shadow, text manipulation handle, and insertion marker, at its current location with the moving selected text block region, including its shadow, text manipulation handle, and insertion marker, at its previous location. Initially, the previous location is an empty image. The union of the current location and the previous location is denoted as the union image (processing box 406). The display area associated with the union image is then copied from the True Buffer to the Scratch Buffer. This action will erase the moving selected text block, including its shadow, text manipulation handle, and insertion marker, from where it was previously drawn (processing box 407). Processing then continues at continuation symbol C starting at the top of FIG. 5.

Figure 5:
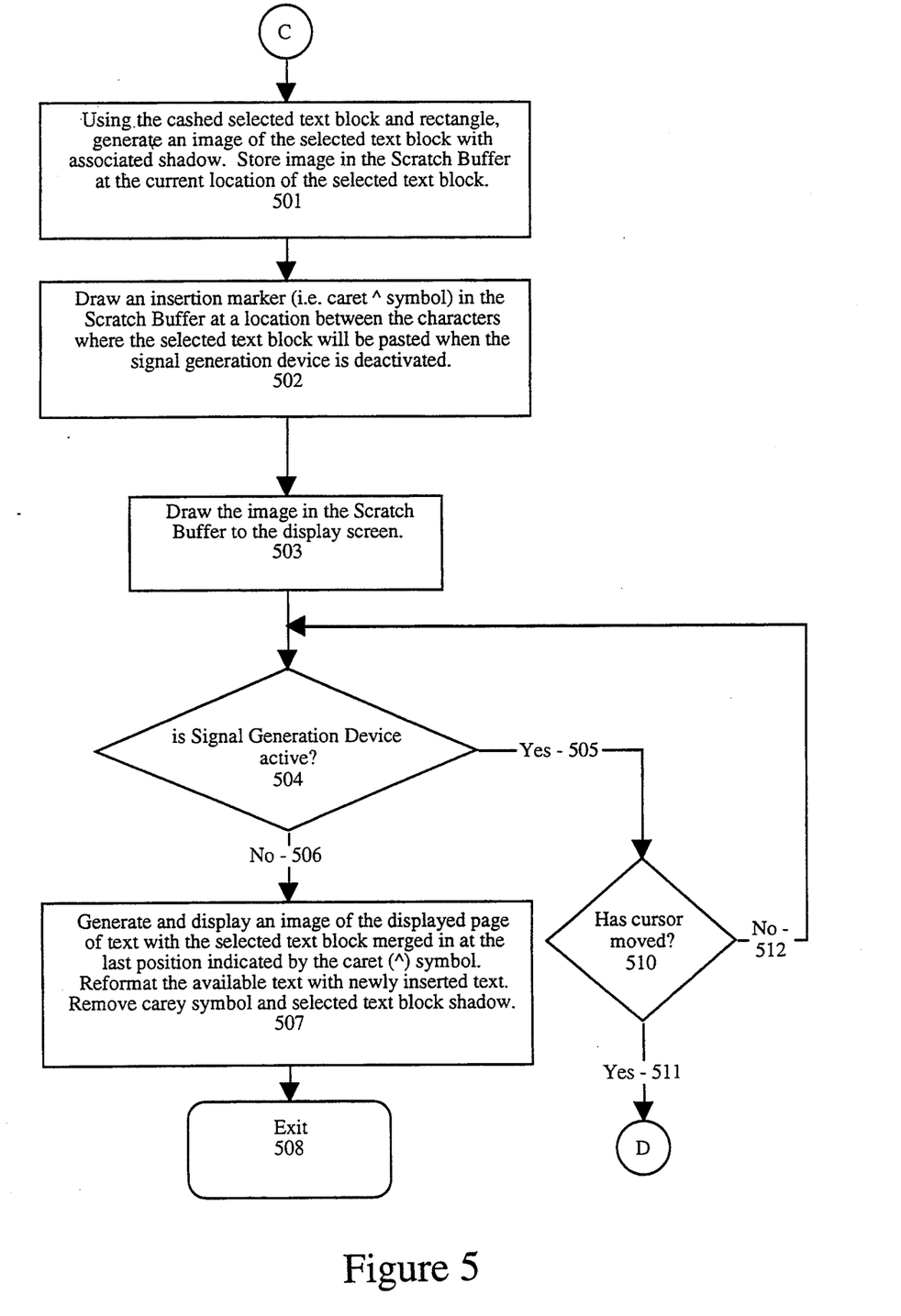

Starting at continuation symbol C in FIG. 5, a displayable image of the moving selected text block with its associated shadow is generated and stored in the Scratch Buffer at the current location of the selected text block (processing box 501). The insertion marker (i.e. caret) is added to the Scratch Buffer at a location between the characters where the selected text block will be pasted or inserted when the signal generation device is deactivated (processing box 502). The area corresponding to the union image in the Scratch Buffer is then displayed on the display screen (processing box 503). The result of these operations produces a display similar to that shown in FIGS. 2b and 2c for the cutting operation and FIGS. 2b and 2e for the copying operation. Processing then continues at decision box 504 where the signal generation device is again queried. If the signal generation device is still active (processing path 505), a test 510 is made to determine if the cursor position has changed. If the cursor position has not changed (processing path 512), no action is necessary. This processing control passes back to decision box 504 on processing path 512. If the cursor position has changed while the signal generation device is active (processing path 511), processing continues at continuation symbol D in FIG. 4 where the position of the selected text block on the display screen is modified as the cursor control device is moved. As long as the signal generation device remains active while the cursor moves, the processing logic between decision box 504 and processing 405 is executed to produce a new displayable image of the moving selected text block as it is moved around the display screen with the cursor control device. Once the signal generation device is deactivated (processing path 506), the selected text block is merged into the available text at a position corresponding to that indicated by the insertion marker (i.e. caret). The available text with newly inserted selected text block is then reformatted to obtain continuity of the lines of available text. The insertion marker and the shadow associated with the selected text block are then removed from the display (processing box 507). This pasting and reformatting operation is illustrated in FIGS. 2d, 2f, and 2i. Processing for the direct text manipulation function then terminates at termination box 508 as illustrated in FIG. 5.

Thus, a means and method for the direct manipulation of text on a computer display screen is disclosed.

Although this invention has been shown in relation to a particular embodiment, it should not be considered so limited. Rather, it is limited only by the appended claims.

What is claimed is:

1. In an interactive computer-controlled display system having a processor, a memory means, a display device coupled to said processor a cursor control device coupled to said processor for interactively positioning a cursor on said display device, and a signal generation device for signaling an active and an inactive control state, a process for directly manipulating a portion of text displayed on said display device, said process comprising the steps of:

selecting a block of text from a set of available text, at least a portion of said available text displayed on said display device;

dragging said selected block of text from a previous position to a new position relative to said available text, at least a portion of said selected block of text being visible as said selected block of text is dragged, said movement of said selected block of text being responsive to movement of said cursor control device, said dragging step comprising;

displaying a text manipulation handle on said display device, said text manipulation handle comprising a graphic element visually associated with said selected block of text, determining whether said cursor is visually positioned within said text manipulation handle displayed on the display device, receiving a signal from said signal generation device indicating that said signal generation device is in an active control state, and upon determining that said cursor is positioned within the text manipulation handle and while the signal generation device is in an active state, dragging said selected block of text and said text manipulation handle from a previous position to a new position relative to said available text while said signal generation device is in an active control state, at least a portion of said selected block of text being visible as said selected block of text is dragged;

displaying an insertion marker on said display device, said insertion marker comprising a graphic element visually associated with said selected block of text, said insertion marker moving with said selected block of text and is indicative of a position in the available text; and inserting said selected block of text into said available text, said selected block of text being inserted at said new position, corresponding to the position of the insertion marker, at least a portion of said available text being reformatted to provide continuity between said available text and said inserted block of text.

2. The process as claimed in claim 1, said dragging step comprising:

displaying a shadow image over an area of the display encompassing at least a portion of the selected block of text; and dragging said selected block of text, said text manipulation handle, said shadow image, and said insertion marker from a previous position to a new position relative to said available text while said signal generation device is in an active control state, at least a portion of said selected block of text being visible as said selected block of text is dragged.

3. The process as claimed in claim 2 wherein said shadow image and said insertion marker are removed in said inserting step.

4. The process as claimed in claim 1 further comprising a step of displaying a predetermined text manipulation cursor symbol if said cursor is positioned within said text manipulation handle, said step of displaying said predetermined text manipulation cursor being performed after said determining step.

5. The process as claimed in claim 1 wherein said text manipulation handle is removed from said display device if said selected block of text is deselected.

6. In an interactive computer-controlled display system having a processor, a memory means, a display device coupled to said processor, said computer-controlled display system further including a true buffer for containing a representation of said available text, and a scratch buffer comprising a representation of said selected block of text, a process for directly manipulating a portion of text displayed on said display device, said process comprising the steps of:

selecting a block of text from a set of available text, at least a portion of said available text displayed on said display device;

dragging said selected block of text from a previous position to a new position relative to said available text, at least a portion of said selected block of text being visible as said selected block of text is dragged, said movement of said selected block of text being responsive to movement of said cursor control device, said moving step comprising;

erasing said selected block text from said true buffer if a cutting operation is selected, retaining said selected block of text in said true buffer if a copying operation is selected, moving said selected block of text in said true buffer from a previous position to a new position relative to said available text, at least a portion of said selected block of text being visible as said selected block of text is dragged, said dragging of said selected block of text being responsive to movement of said cursor control device, generating a union region resulting from the combination of a first region and a second region, said union region of a determined area and location of the available text located in the true buffer, said first region comprising an area of said true buffer corresponding to the area occupied by said selected block of text at the previous position, said second region comprising an area of said true buffer corresponding to the area occupied by said selected block of text at said new position, copying said union region of available text from said true buffer to said scratch buffer, drawing said selected block of text to said scratch buffer at said new position, and displaying said scratch buffer on said display device;

displaying an insertion marker on said display device, said insertion marker comprising a graphic element visually associated with said selected block of text, said insertion marker moving with said selected block of text and is indicative of a position in the available text; and inserting said selected block of text into said available text, said selected block of text being inserted at said new position, corresponding to the position of the insertion marker, at least a portion of said available text being reformatted to provide continuity between said available text and said inserted block of text.

7. The process as claimed in claim 6 wherein said scratch buffer further comprises a representation of said insertion marker, a shadow image of an area encompassing at least a portion of the selected block of text, a text manipulation handle comprising a graphic element visually associated with the selected block of text, and a portion of said available text, said insertion marker, said shadow image, said text manipulation handle, and said portion of said available text being included in said union region generated in said generating step.

8. In an interactive computer-controlled display system having a processor, a memory means, a display device coupled to said processor for visibly displaying text, a cursor control device coupled to said processor for interactively positioning a cursor on said display device, and a signal generation device for signaling an active and an inactive control state, a device for directly manipulating a portion of text displayed on said display device, comprising:

means for selecting a block of text from a set of available text, at least a portion of said available text displayed on said display device;

means for dragging said selected block of text from a previous position to a new position relative to said available text, at least a portion of said selected block of text being visible as said selected block of text is dragged, said movement of said selected block of text being responsive to movement said cursor control device, said means for dragging comprising;

means for displaying a text manipulation handle on said display device, said text manipulation handle comprising a graphic element visually associated with said selected block of text;

means for determining if said cursor is visually positioned within said text manipulation handle displayed on the display device;

means for receiving a signal from said signal generation device indicating that said signal generation device is in an active control state; and means for dragging said selected block of text and said text manipulation handle, in response to the determination by said means for determining that said cursor is positioned within the text manipulation handle and the signal generation device is in an active state, from a previous position to a new position relative to said available text while said signal generation device is in an active control state, at least a portion of said selected block of text being visible as said selected block of text is dragged;

means for displaying an insertion marker on said display device, said insertion marker comprising a graphic element associated with said selected block of text, said insertion marker moving with said selected block of text and is indicative of a position in the available text; and means for inserting said selected block of text into said available text, said selected block of text inserted at said new position, corresponding to the position of the insertion marker, at least a portion of said available text being reformatted to provide continuity between said available text and said inserted block of text.

9. The device as claimed in claim 8, said means for dragging comprising:

means for displaying a shadow image over an area of the display encompassing at least a portion of the selected block of text; and means for dragging said selected block of text, said text manipulation handle, said shadow image, and said insertion marker from a previous position to a new position relative to said available text while said signal generation device is in an active control state, at least a portion of said selected block of text being visible as said selected block of text is dragged.

10. The device as claimed in claim 9 wherein said shadow image and said insertion marker are removed by said means for inserting.

11. The device as claimed in claim 8 further comprising a means for displaying a predetermined text manipulation cursor symbol if said cursor is positioned within said text manipulation handle.

12. The device as claimed in claim 8 wherein said text manipulation handle is removed from said display device if said selected block of text is deselected.

13. In an interactive computer-controlled display system having a process, a true buffer comprising a representation of said available text, a scratch buffer comprising a representation of said selected block of text, a display device coupled to said processor for visibly displaying text, a cursor control device coupled to said processor, a device for directly manipulating a portion of text displayed on said display device comprising:

means for selecting a block of text from a set of available text, at least a portion of said available text displayed on said display device;

means for dragging said selected block of text from a previous position to a new position relative to said available text, at least a portion of said selected block of text being visible as said selected block of text is dragged, said movement of said selected block of text being responsive to movement of said cursor control device;

means for displaying an insertion marker on said display device, said insertion marker comprising a graphic element associated with said selected block of text, said insertion marker moving with said selected block of text and is indicative of a position in the available text;

means for inserting said selected block of text into said available text, said selected block of text inserted at said new position, corresponding to the position of the insertion marker, at least a portion of said available text being reformatted to provide continuity between said available text and said inserted block of text;

means for erasing said selected block of text from said true buffer if a cutting operation is selected;

means for retaining said selected block of text in said true buffer if a copying operation is selected;

means for dragging said selected block of text in said true buffer from a previous position to a new position relative to said available text, at least a portion of said selected block of text being visible as said selected block of text is dragged, said dragging of said selected block of text being responsive to movement of said cursor control device, said means for dragging comprising;

means for generating a union region resulting from the combination of a first region and a second region, said union region of a determined area and location of the available text located in the true buffer, said first region comprising an area of said true buffer occupied by said selected block of text at said previous position, said second region comprising an area of said true buffer occupied by said selected block of text at said new position, means for copying from said true buffer to said scratch buffer an area of available text corresponding to the location of the area occupied by the union region, means for drawing said selected block of text to said scratch buffer at said new position, and means for displaying said scratch buffer on said display device.

14. The device as claimed in claim 13 wherein said scratch buffer further comprises a representation of said insertion marker, a shadow image of an area encompassing at least a portion of the selected block of text, a text manipulation handle comprising a graphic element visually associated with the selected block of text, and a portion of said available text, said insertion marker, said shadow image, said text manipulation handle, and said portion of said available text being included in said union region generated by said generating means.

* * * * *